United States Patent [19]

Strelow

[11] 4,222,515
[45] Sep. 16, 1980

[54] PARALLEL DIGITAL DATA PROCESSING SYSTEM WITH AUTOMATIC FAULT RECOGNITION UTILIZING SEQUENTIAL COMPARATORS HAVING A DELAY ELEMENT THEREIN

[75] Inventor: Horst Strelow, Cremlingen, Fed. Rep. of Germany

[73] Assignee: Siemens Aktiengesellschaft, Berlin & Munich, Fed. Rep. of Germany

[21] Appl. No.: 909,003

[22] Filed: May 24, 1978

[30] Foreign Application Priority Data

Jun. 29, 1977 [DE] Fed. Rep. of Germany ....... 2729362

[51] Int. Cl.² .......................................... G06F 11/08
[52] U.S. Cl. .................................................. 371/68
[58] Field of Search ................. 235/307; 364/200, 900

[56] References Cited

U.S. PATENT DOCUMENTS

| | | | |
|---|---|---|---|
| 3,471,686 | 10/1969 | Connell | 235/307 |
| 3,517,174 | 6/1970 | Ossfeldt | 235/307 X |
| 3,646,516 | 2/1972 | Flinders et al. | 235/307 X |
| 3,810,119 | 5/1974 | Zieve et al. | 364/200 |
| 3,931,505 | 1/1976 | Seveik | 235/307 |
| 3,978,327 | 8/1976 | Huber | 235/307 |
| 4,012,717 | 3/1977 | Censier et al. | 364/200 |
| 4,020,459 | 4/1977 | Coomer | 235/307 X |
| 4,030,074 | 6/1977 | Giorcelli | 235/307 X |
| 4,096,990 | 6/1978 | Strelow | 235/307 |

*Primary Examiner*—David H. Malzahn
*Attorney, Agent, or Firm*—Hill, Van Santen, Steadman, Chiara & Simpson

[57] ABSTRACT

A digital data processing arrangement for railroad installations having two similarly designed sequential circuits employing microprocessors and operating in accordance with the 2v2-principle. A joint pulse current supply produces two control signal pairs which are displaced with respect to each other by at least one processing step, whereby the two sequential circuits which are processing the same information in relation to the respective processing phase exhibit a condition of inequality. Thereby, interferences simultaneously affecting the two sequential circuits in the same manner have a different readable effect. Specific comparators which take into consideration the condition of inequality are connected to similar inputs or outputs of the microprocessors. The comparison output of the comparators is interrogated by the pulse current supply after each processing step in a conjunctively linked manner. This leads to the release of an additional control signal pair required for the subsequent processing step. The pulse current supply is cut off when a faulty comparison is present.

3 Claims, 2 Drawing Figures

PARALLEL DIGITAL DATA PROCESSING SYSTEM WITH AUTOMATIC FAULT RECOGNITION UTILIZING SEQUENTIAL COMPARATORS HAVING A DELAY ELEMENT THEREIN

BACKGROUND OF THE INVENTION

1. Description of the Prior Art

Digital data processing arrangements to detect faults in data processing systems used in facilities that may be rendered unsafe by faulty data are known and, for example, disclosed in a magazine entitled "URTL-Circuit System U1 Having High Safeguard and Automatic Fault Diagnosis", *SIEMENS ZEITSCHRIFT*, 48th year, Vol. 7, July 1974, Pages 490 through 506.

In such systems, the process activating signals are switched off when a digital fault in data processing occurs. Devices are provided to recognize faulty data conditions and to cut off the operation before faulty control commands are rendered. In order to increase the availability of equipment, duplicate facilities are often provided. However, such duplicate facilities do not normally have the necessary safeguards to protect against the receipt of faulty data. Accordingly, such prior art systems, may still, lack proper fail-safe fault recognition equipment and hence may be a danger to people and equipment.

2. Field of the Invention

The field of art to which this invention pertains is fault recognition equipment and in particular to such equipment for use in connection with railroad safety devices.

SUMMARY OF THE INVENTION

It is an important feature of the present invention to provide an improved safety system for a data processing arrangement.

It is a further feature of the present invention to provide a digital data processing arrangement for railroad installations to improve the safety of fault recognition equipment.

It is a principal object of the invention to provide a digital data processing arrangement having two similarly designed sequential circuits having a joint pulse current supply which produces two control signal pairs displaced with respect to each other by at least one processing step such that the two sequential circuits exhibit a condition of inequality such that the same outside interference will have a different effect on the two circuits.

It is also an object of the present invention to provide a digital data processing arrangement as described above which employs a number of comparators connected in a series arrangement and linking the data being processed by the two sequential circuits.

These and other objects, features and advantages of the present invention will be understood in further detail by consideration of the drawing and the description of the preferred embodiment.

DESCRIPTION OF THE PREFERRED EMBODIMENT

Figure 1:
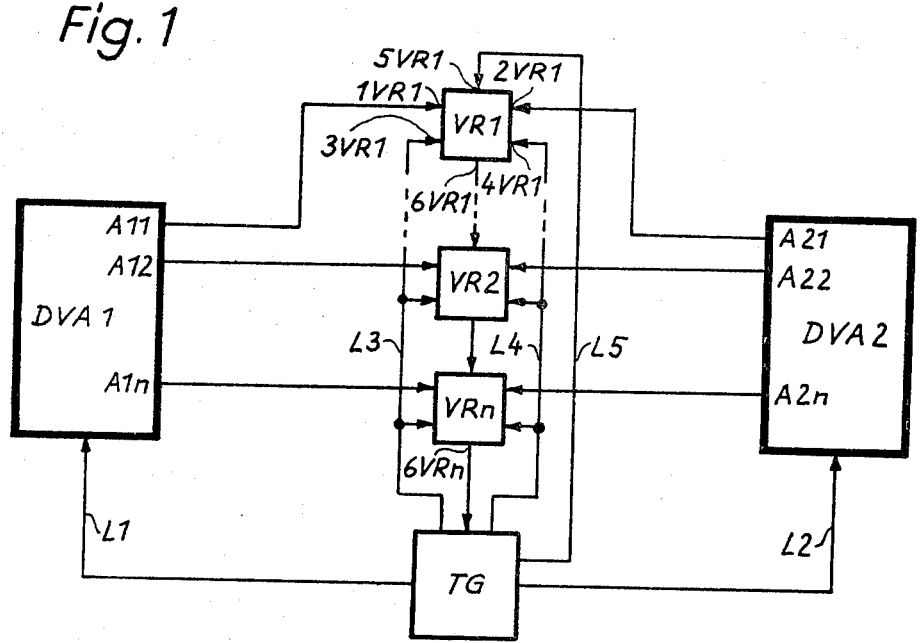
FIG. 1 illustrates a two-channel data processing arrangement.

The invention relates to a digital data processing arrangement particularly suited for, but not limited to, railroad safety devices having two control mechanisms which process the same information in accordance with the 2v2-principle. The information is processed in two channels stepwise controlled by a common current pulse supply network. This network outputs a monitoring pulse with each processing step along with several control signal pairs. The device has comparators which compare two signals from the two control channels. The comparators have an input for monitoring impulses and one output via which the monitoring impulses are passed as faultless messages when correct signal pairs are present. In this way, the comparators form a series connection for the linking of individual fault-free messages. The last comparator in the series outputs its fault-free message to release the control signal pairs required for the next processing step, and produces an additional monitoring impulse to the pulse supply network.

In a number of technical situations, for example, in the monitoring of nuclear reactors or the control of railroad installations, operations must take place in accordance with an accepted safety-technical principle, which provides that technical faults must be prevented from developing into a condition which is unsafe for people or equipment. For example, in railroad installations, a high signal level is assigned to all process-activating signals, and this level is switched off in all output channels when a technical fault in the data processing occurs. Devices therefore are necessary to recognize a faulty data processing condition and react in a cut-off manner before faulty control commands reach the process or device being safeguarded. In order to increase the availability of equipment, the data processing installation can have duplicate facilities with the idea being that after a fault has occurred in one of the two data processing installations, a switch-over to the other installation occurs. The other installation processes the same information in a parallel operation; it is assumed that this second data processing installation operates correctly at the time of the switch-over.

Double systems of this type indeed desirably have an increased facility availability, however, they do not have the necessary safeguards as initially mentioned. In regard to the necessary safeguards, it must not be so limited that only individual installation components of a double system are cut-off when a fault occurs. Thus, for safety reasons, it is not possible to continue operation with only one data processing installation of the double system because this data processing installation, for lack of a safe fault recognition mechanism, may endanger people and equipment. In accordance with the above-recited principle, both data processing installations must be cut-off in double systems designed for safeguard-technical controls, when a fault is recognized.

The present invention is an improvement over the known digital data processing arrangement of the above-mentioned type which, for example, is described under the title "URTL-Circuit System U1 Having High Safeguard and Automatic Fault Diagnosis", *SIEMENS ZEITSCHRIFT*, 48th year, Vol. 7, July 1974, Pages 490 through 506. This known two-channel data processing arrangement guarantees a high degree of safeguard against faults without its individual storing or linking logic elements or sequential circuits being constructed in accordance with the fail-safe principle. A joint pulse current supply for stepwise controlling the two sequential circuits is provided for the two channels. In addition, the known two-channel data processing arrangement provides a multiplicity of comparators which individually monitor signal pairs for equivalence or antivalence, respectively. The individual comparators form a series connection in which the comparator provided in the first sequential position obtains the monitoring impulse released by the pulse current supply. With the method of operation of the two-channel data processing arrangement determined to be correct by the individual comparators, the monitoring impulse passes through all comparators and, after leaving the comparator in the last sequential position, is finally used for the release of the next processing step and the signals connected therewith.

In this known double system, the pulse current supply associated with the two-channel data processing arrangement forms a type of holding current for fault determination.

The invention uses a digital data processing arrangement having a high degree of processing safety in which outside electric interferences penetrating the two channels affect the comparator in a manner which can be recognized and with a relatively high processing speed.

The signals of each control signal pair are displaced by at least one processing step in relation to one another.

Each of the comparators comprise a transistor amplifier which has a switching path connected to the output of a first D-flip-flop and to the negated output of a second D-flip-flop via a rectifier bridge. A digital delay element is connected to the input of the first D-flip-flop for the same number of processing steps as the signals of the control signal pairs are displaced in relation to one another; the signals to be compared are conveyed to the inputs of the delay elements and of the second D-flip element.

The pulse inputs of all first D-flip elements or second D-flip elements of the comparators are connected to the pulse current supply via two separate lines in order to respectively take over a time pulse at the end of each processing step.

Thus, the sequential circuits provided in the two processing channels operate synchronously, however, they are displaced by at least one processing step. Due to the inequality of the two channels pertaining to the processing phase, the outside interferences which simultaneously and similarly affect the two channels have a different effect upon the data processing so that the presence of faulty data can be recognized. By utilizing a specific comparator, in spite of the dependency of the pulse current supply thereupon, no processing gaps are caused which would reduce the data processing speed, so that the total data processing arrangement exhibits high processing speed.

As far as safety is concerned, it is normally sufficient to displace the signals of the control signal pairs by one single processing step in relation to one another. Then, advantageously, the delay element can consist of a third D-flip element to receive information at the trailing edge of the clock pulses, whereby the first and the second D-flip elements are provided to receive information at the leading edge of the clock pulses.

The digital data processing arrangement in accordance with FIG. 1 schematically illustrates a two-channel design with a data processing installation DVA1 in the one processing channel, and with a second data processing installation DVA2 in the other processing channel. Both data processing installations process synchronously the same information conveyed by the process in a pulse controlled manner, however, their function is displaced by one processing step. A joint pulse current supply TG provides joint control of the two data processing installations DVA1 and DVA2. It supplies the two data processing installations DVA1 and DVA2 with control signals via multiple lines L1 or L2. These control signals are displaced by one processing step in relation to one another. Thereby, a condition of inequality is obtained in the two data processing installations DVA1 and DVA2 which, for example, can be microprocessors at equal time points regarding the processing phases, whereby similar and simultaneously electric interferences, affecting the two data processing installations, DVA1 and DVA2, have a dissimilar effect on the system.

A multiplicity of comparators VR1-VRn are connected in series in order to obtain a 2v2-system regarding an interrogation condition. The comparators compare signals on similar output lines, for example, A11 and A21 or A12 and A22 or A1n and A2n of the two data processing installations DVA1 and DVA2. The outputs of the data processing installations mentioned are not only the outputs which convey information for the process to be controlled, but also pertain to such lines as those which convey address, program information or intermediate information, such as an internal BUS coupling a microprocessor and modules being used in conjunction with the microprocessor in order to construct data processing installation DVA1 or DVA2, respectively. In addition to the inputs 1VR1 and 2VR1 of the comparator VR1 which convey the signals to be compared, each of the comparators has two inputs 3VR1 and 4VR1 for accommodating two chronologically congruent clock pulses which are independent from one another and which are respectively released by the pulse current supply TG via two lines L3 and L4 at the end of each processing step. Each of the comparators VR1 through VRn additionally has an input, for example 5VR1, in order to convey a monitoring impulse which lies approximately inbetween each processing step. The monitoring impulse from the pulse current supply TG is conveyed to the comparator VR1 via line L5. When the signals to be compared and which are conveyed to the comparator VR1 are identical, the monitoring impulse is again outputed via the output 6VR1. This signal is then used as a monitoring impulse in order to interrogate the next monitoring element VR2. The individual comparators VR1 through VRn in this manner form a series connection which all pass the monitoring impulse given by the pulse current supply TG when the data processing proceeds orderly, whereby the comparator VRn, provided in last position of the series connection, gives a faultless message to the pulse current supply TG via its output 6VRn, when the operation proceeds correctly. This faultless message is used to release the control signal pairs required for the next processing step of the two data processing installations DVA1 and DVA2 and to release an additional monitoring impulse. At least one of the comparators VR1 through VRn interrupts the path of the signal when a fault exists in one of the two data processing installations, and the pulse current supply TG is inactivated until a service operation is undertaken. The two-channel data processing arrangement is therby cut off and the output of perhaps dangerous information is prevented.

Figure 2:
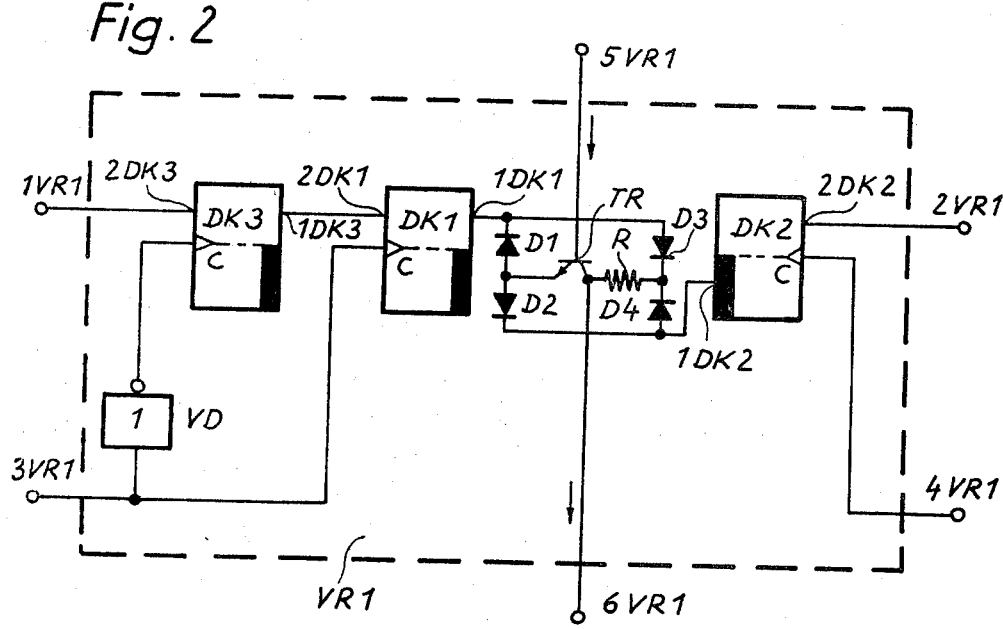
FIG. 2 shows the embodiment of an advantageous comparator.

The circuit arrangement in accordance with FIG. 2 illustrates in more detail a preferred comparator. Reference symbols already used in conjunction with comparator VR1 are again used in this illustration. The comparator VR1 comprises a transistor amplifier with a transistor TR which has a switching circuit supplied with current via a rectifier bridge circuit D1, D2, D3 and D4 and an impedance R. This rectifier bridge circuit is connected to the output 1DK1 of a D-flip element DK1 on one hand, and with the negated output 1DK2 of a second D-flip element DK2 on the other. An additional D-flip element DK3 is connected with its output 1DK3 to the input 2DK1 of the D-flip element DK1, said D-flip element DK3 whose input 2DK3 forms the one input 1VR1 of the comparator VR1. The input 2DK2 of the second D-flip element DK2 forms the other input 2VR1 of the comparator VR1. All three D-flip elements DK1, DK2 and DK3 have a pulse input C for control to permit the corresponding D-flip element to take over the value of the connected signal of a clock pulse conveyed via the respective pulse input C and present at the input 2DK1 or 2DK2 or 2DK3, respectively. The clock pulses are directly conveyed to the input C of the D-flip element DK1, on one hand via the input 3VR1, and are indirectly conveyed to the input C of the D-flip element DK3 via an inverter VD. The clock pulses necessary for the control of the D-flip element (flop) DK2 reach the respective pulse input C via the input 4VR1 of the comparator VR1.

If, for example, D-flip elements are available which a pulse input being effective during a transit of 1 to 0, such a D-flip element can be utilized instead of the illustrated D-flip element DK3 which would have the advantage that the inverter VD could be eliminated. The monitoring impulses conveyed to the comparator VR1 via the input 5VR1 are coupled to the base electrode of the transistor TR. When, as more precisely explained later, a correct data processing operation has previously taken place, the outputs 1DK1 and 1DK2 of the two D-flip flops DK1 and DK2 have opposite switching states at the time a monitoring impulse is present, and the monitoring impulse is again given off via the output 6VR1 as a fault-free message. Due to the use of the rectifier bridge connection for the current supply of the transistor TR it does not matter which switching states are present in the D-flip elements DK1 and DK2 so the correct polarity of the supply voltage is always provided for the current supply.

As already explained with the aid of the circuit arrangement in accordance with FIG. 1, the two data processing installations DVA1 and DVA2 operate displacedly in relation to one another by one pulse step due to the respective supply control signals. Thus, for example, the data processing installation DVA1 vis-a-vis the data processing installation DVA2 is advanced by one processing step during the data processing. This leading feature is compensated for in the comparators VR1 through VRn by a delay element in the form of a third D-flip flop, at the end of a processing step, takes over the value of the signal connected to the input 2DK3 during the transition from state "1" to state "0" of the clock pulse conveyed via the input 3VR1. At the end of the processing step considered, the condition of the subsequent clock pulse stored in the D-flip flop DK3 is taken over by the subsequent D-flip flop DK1 during the transmit from "0" to "1", whereas the same signal value is simultaneously taken over by the D-flip element DK2 via the input 2DK2 when the two-channel data processing installation operates correctly. After the read-out at the leading edge of said clock pulse from the D-flip element DK3, said logic element can store the next signal value at the trailing edge of the same clock pulse. After the signals are assumed by the D-flip flops DK1 and DK2, the actual comparison results during the instant processing step, by means of the monitoring impulse. This comparison, with correct data processing, results in the conveyance of the monitoring pulse as a fault-free message via the output 6VR1.

In a different embodiment, in which the chronological displacement of the two data processing installations DVA1 and DVA2 is larger than one processing step, a shift register can advantageously be used as prestore instead of the D-flip flop DK3 having as many steps as processing steps are provided for the chronologically displaced operation of the two data processing installations.

I claim:

1. A digital data processing system comprising:
two processors each receiving identical input data and independently processing the data in a series of processing steps, each said processor having a plurality of sequential outputs, with corresponding outputs from each processor comprising a plurality of sequential output pairs;

a joint pulse current supply connected to each processor for supplying respective control signals thereto, one of said control signals being displaced in time by at least one processing step with respect to the other control signal and being otherwise identical thereto;

said joint pulse current supply further having a monitoring signal output at which a monitoring signal consisting of successive pulses each having a temporal position corresponding to a processing step in said processors is produced;

said joint pulse current supply further generating two identical clock pulse signals at respective first and second clock pulse outputs;

a plurality of comparators each connected to a respective one of said output pairs and each having a monitoring signal input and a monitoring signal output, said plurality including a first comparator having its monitoring signal input connected to said monitoring signal output of said joint pulse current supply, and including a last comparator having its monitoring signal output connected to said joint pulse current supply, and including a remainder of comparators connected in series between said first and last comparators through the respective monitoring signal inputs and outputs;

each comparator further comprising
a transistor amplifier having a control electrode serving as said monitoring signal input, an output electrode serving as said monitoring signal output, and a signal electrode, a four-rectifier bridge connected directly to said signal electrode and through a resistor to said output electrode, a first flip-flop cell having a non-inverted output connected to one side of said rectifier bridge and having a signal input, and a pulse input connected to said first clock-pulse output of said joint pulse current supply, a second flip-flop cell having an inverted output connected to the other side of said rectifier bridge and having a signal input connected to one of said processor outputs forming a sequential output pair, and a pulse input connected to said second clock pulse output of said joint pulse current supply, a delay element having an input connected to a processor output forming the other of a processor output pair having a connection to said second flip-flop cell, said delay element having an output connected to the signal input of said first flip-flop cell and transmitting a signal thereto which is delayed by a number of proccessing steps equal to the number of processing steps by which said control signals are displaced;

each said comparator connected to a processor output pair generating an enabling monitoring signal at its monitoring signal output if said pair is comprised of opposite logic states and generating a disabling monitoring signal if said pair is comprised of like logic states, said disabling monitoring signal acting to cease operation of said joint pulse current supply.

2. The digital data processing system of claim 1 wherein said control signals are displaced by one processing step with respect to each other and said delay element consists of a third flip-flop cell and each said comparator further includes an inverter, said third flip-flop cell having a signal input serving as said delay element input and a pulse input connected through said inverter to said first clock pulse output of said joint pulse current supply whereby said third flip-flop cell receives information at a trailing edge of said clock pulse signals and said first and second flip-flop cells receive the same information at a leading edge of said clock pulse signals.

3. The digital data processing system of claim 2 wherein said control signals are displaced by an amount greater than one processing step and wherein said digital delay element is a shift register having a built-in delay equal to a number of processing steps corresponding to the displacement between said control signals.

* * * * *